Dec. 29, 1925.
A. BOOMHOVER
1,567,904
ANTISKID DEVICE
Filed June 11, 1924    2 Sheets-Sheet 1
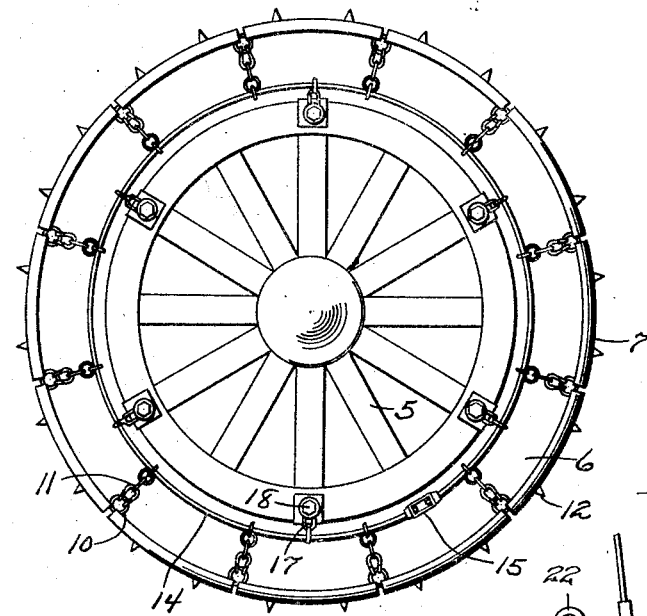
Fig. 1.
Fig. 6.
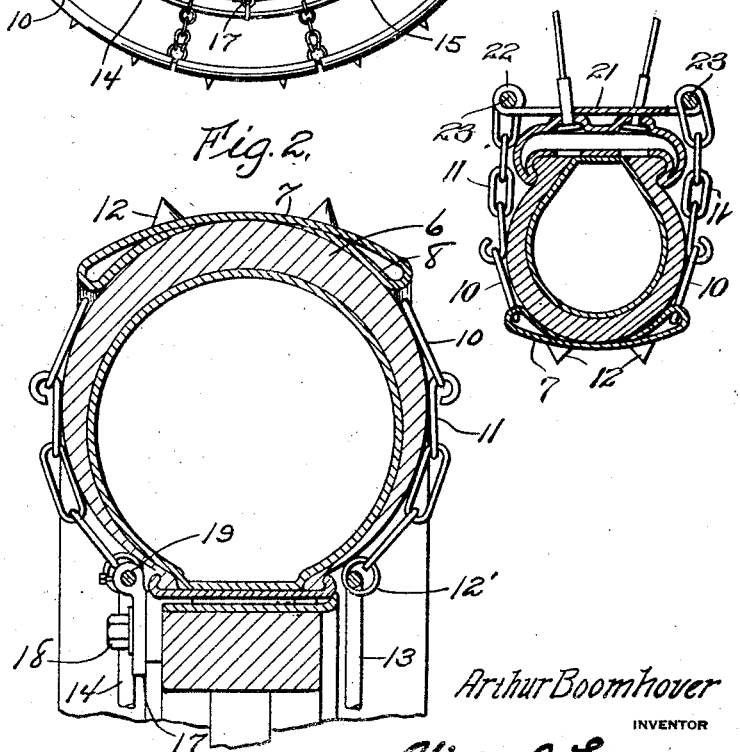
Fig. 2.
Arthur Boomhover
INVENTOR
BY Victor J. Evans
ATTORNEY
WITNESS:

Dec. 29, 1925.
A. BOOMHOVER
ANTISKID DEVICE
Filed June 11, 1924　　2 Sheets-Sheet 2
1,567,904
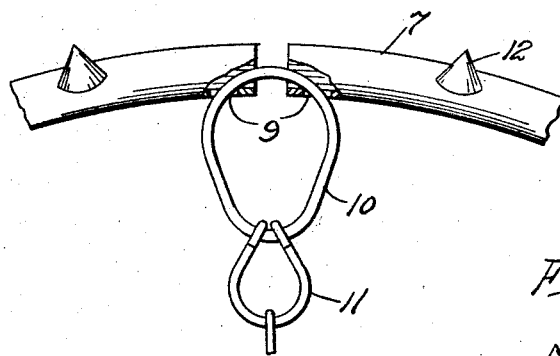
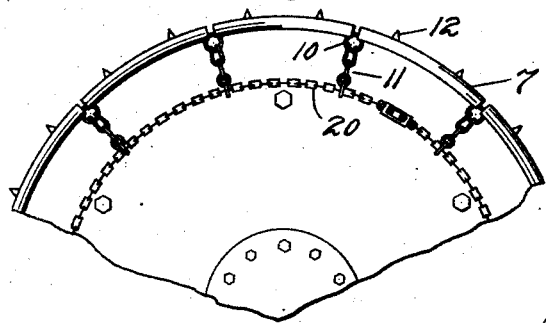
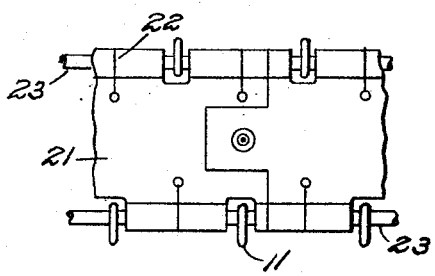
Arthur Boomhover
INVENTOR
BY Victor J. Evans
ATTORNEY
WITNESS Patented Dec. 29, 1925.

1,567,904

UNITED STATES PATENT OFFICE.

ARTHUR BOOMHOVER, OF ST. ALBANS, VERMONT.

ANTISKID DEVICE.

Application filed June 11, 1924. Serial No. 719,419.

*To all whom it may concern:*

Be it known that I, ARTHUR BOOMHOVER, a citizen of the United States, residing at St. Albans, in the county of Franklin and State of Vermont, have invented new and useful Improvements in Antiskid Devices, of which the following is a specification.

My invention relates to anti-skid devices for pneumatic tires and its principal object is to provide an anti-skid device embodying a plurality of loosely connected plates adapted to be mounted upon the periphery of the pneumatic tire in such a manner as to protect the same and at the same time afford a road gripping means.

Another object of the invention is to provide a device of this character which may be readily associated with the tire or removed therefrom when desired.

With the preceding and other objects and advantages in mind, the invention consists in the novel combination of elements, construction and arrangement of parts, and operation, to be hereinafter specifically referred to, claimed and illustrated in the accompanying drawings, wherein:

Figure 1 is a side elevation of a vehicle wheel having my improved anti-skid device mounted on the pneumatic tire thereof;

Figure 2 is a transverse sectional view of the same;

Figure 3 is a fragmentary view, having parts broken away;

Figure 4 is an elevation of one of the antiskid elements embodied in the invention;

Figure 5 is a fragmentary elevation of a modified embodiment of the invention;

Figure 6 is a cross sectional view of the second modified form of the invention;

Figure 7 is an elevation of parts of the device shown in Figure 6; and

Figure 8 is a fragmentary detail view of the same.

Referring to the drawings in detail wherein corresponding characters of reference denote corresponding parts throughout the several views, the numeral 5 designates a conventional automobile wheel upon which the usual pneumatic tire 6 is mounted.

Removably arranged about the tread of the tire 6 is a plurality of longitudinally transversely bowed plates 7 each of which is formed from a length of sheet metal and has its longitudinal edges bent inwardly upon themselves as indicated at 8 and formed with perforations 9 at their ends, which receive links 10 of short chains 11. Tapered lugs or ground gripping elements 12 are removably associated with the plates 7 which penetrate the ground and hold the vehicle wheel against skidding.

A ring 12' is carried by the ends of each of the short chains 11 and one side of the tire receives an annulus or ring 13. The rings 12' of the short chains on the opposite side of the tire receive a split ring 14 whose ends are engaged by a turnbuckle 15. This split ring 14 is retained in operative position by means of plates 17 which are held in place by the usual nuts 18 of the conventional demountable rim illustrated and which are formed with eyes 19 through which this ring 14 passes.

In the modified embodiment of the invention as shown in Figure 5, the structure is particularly adapted for a disk wheel and in this embodiment of the invention flexible side chains 20 are provided to which the short side chains 11 are attached.

In the embodiment of the invention shown in Figures 6, 7, and 8, a flexible circumferential band 21 is provided and is arranged upon the inner face of the rim. This flexible band 21 is formed with inwardly extending slits which are disposed in staggered relation and for the purpose of receiving the spokes of the wheel. The edges of the band 21 are turned upon themselves to provide tubular housings 22 through which rings 23 extend. These rings 23 carry the side chains 11 for holding the plates to the tire tread. The rings 23 are first disengaged from the tubular housing 22. The flexible band 21 is then arranged upon the inner face of the felly with the spokes passed through the split. The rings 23 are then inserted within the tubular housing 22 and adjusted. In this form of the invention the rings 23 are adjusted circumferentially by means of a turnbuckle structure 24.

While I have shown and described the preferred embodiment of the invention, it is to be understood that changes in the arrangement of parts may be made and that I am only limited by the appended claims.

What is claimed is:—

1. An anti-skid device comprising a flexible band adapted to be arranged upon the inner face of a vehicle wheel rim and formed with circumferential housings at its edges, the band being provided with slits at its edges which are arranged in staggered relation and adapted to receive the spokes of a wheel, rings carried by the housings and short chains depending from the rings, and anti-skid means adapted to embrace the tire and carried by the chains, and means for securing the flexible band to a pneumatic tire and the wheel rim.

2. An anti-skid device comprising a flexible band adapted to be arranged upon the inner face of a pneumatic tire rim, circumferentially arranged housings on the edges of the band, split rings arranged to pass through the housings and having their ends detachably connected together, a tire armor, and operative connections between the tire armor and the split rings.

In testimony whereof I affix my signature.

ARTHUR BOOMHOVER.